UNITED STATES PATENT OFFICE.

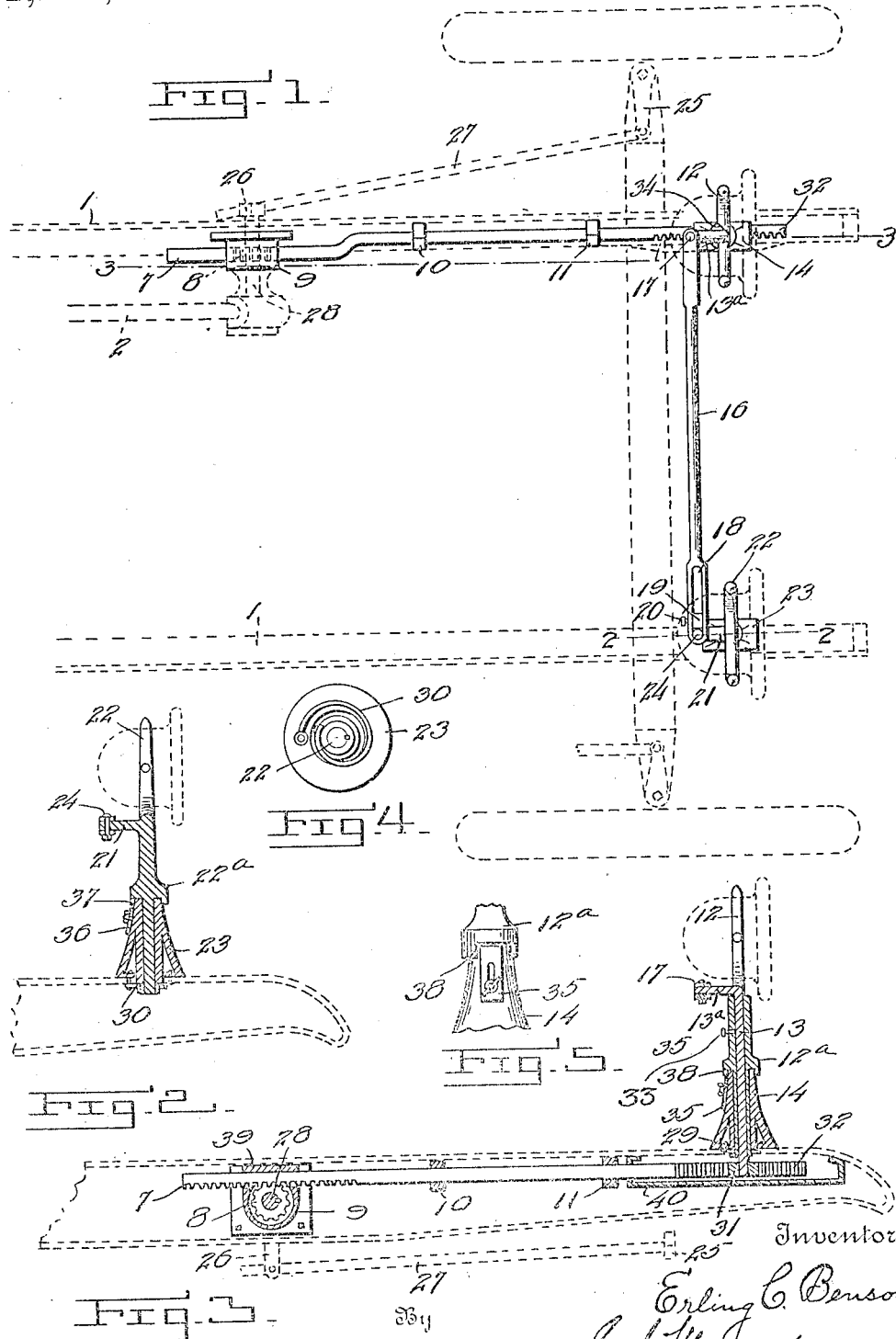

ERLING C. BENSON, OF ALBUQUERQUE, NEW MEXICO.

AUTOMOBILE-LAMP DEFLECTOR.

1,206,980.

Specification of Letters Patent.

Patented Dec. 5, 1916.

Application filed May 18, 1915. Serial No. 28,983.

*To all whom it may concern:*

Be it known that I, ERLING C. BENSON, a citizen of the United States, residing at Albuquerque, in the county of Bernillio and State of New Mexico, have invented certain new and useful Improvements in Automobile-Lamp Deflectors, of which the following is a specification.

This invention relates to certain improvements in mechanism for controlling the movements of automobile lamps, and more particularly to mechanism which is designed to be operated simultaneously with the steering mechanism in such manner as to cause the rays of light from the lamps carried by the machine, to be thrown in the path of the automobile.

Having in view the above, and other important objects, the invention consists in the construction of the parts of the device, and their relative arrangement, as will be hereinafter more fully described and claimed.

In the accompanying drawings, which illustrate one embodiment of the invention; Figure 1 is a plan view of mechanism for controlling the position of the lamps of an automobile, certain parts of the automobile being represented by broken lines to show their relation with the elements of the present invention; Fig. 2 is a detail view, in vertical section, through the right hand lamp of the machine on the line 2—2, of Fig. 1; Fig. 3 is a vertical section on the line 3—3, Fig. 1; and Figs. 4 and 5 are views of details.

1, 1 represent the longitudinally extending members of the frame of a motor vehicle, and the left hand member 1 of the frame carries a housing 9 in which turns, in suitable bearing, an arbor 28. The inner end of this arbor is provided with the usual worm gear, which meshes with a worm fast to the lower end of the steering wheel shaft 2, the latter being indicated by broken lines in Fig. 1. The steering wheel worm, and the worm gear carried by the arbor 28, are not shown in the drawings, the same being of known construction and not forming parts of the present invention.

The arbor 28 has keyed, or otherwise fast thereto, a pinion 8 which is inclosed within a portion of the housing 9. The pinion 8 meshes with the teeth of a rack formed at one end portion of the bar 7, which slides freely in guides 10 and 11, secured to the frame firmly, and is provided along the inner side of its opposite end portion with rack teeth 32. The teeth 32 mesh with a pinion 31, which is rigidly fastened to the lower end of a rod 13, whose upper end is bent to form a crank 13ª. The rod 13 fits snugly within a bore formed longitudinally through the lamp holder 12, which latter comprises a vertical stem, and two forked portions for supporting the lamp. A set screw 33, provided with a jam nut, serves to hold the rod 13 firmly in the bore through the stem portion of the lamp holder 12. The stem portion of the lamp holder 12 has bearings within the lamp bracket 14, which latter is secured rigidly to one of the side members of the frame 1. The upper end of the hole in the lamp holder 12, which receives the bent portion of the rod 13, is cut away at 34, Fig. 1, providing thereat a triangular slot. With this construction the angular part 13ª will engage a shoulder or abutment on the lamp holder 12 to cause turning movement of the latter when the angular end 13ª is moved to the right; when, however, this angular end is moved to the left it will not turn the lamp holder because of the clearance afforded by the cut away portion 34. A rod 16 is connected pivotally by a pin 17 to the outer end of the arm 13ª, and the opposite end of rod 16 is provided with a slot 18 within which a pin 24 passes, and serves to connect the rod pivotally with the outer end of a crank arm 21 extending rigidly back from a lamp holder 22, located at the right hand side of the front of the machine. The lamp holder 22 is provided with forked portions for embracing the lamp, and the lower end of the lamp holder is formed as a spindle which has bearing within the bore of a lamp bracket 23, which is secured rigidly to the right hand member of the frame 1. A block 19 fits within the slot 18, and has its outer end portion curved to embrace snugly a portion of the pin 24, and a set screw 20 enters a thread in the side of the slotted portion 18 of the rod 16, and serves to clamp the block 19 firmly in position, as shown in Fig. 1.

The lamp holders 12, and 22, are, respectively, provided with bosses 12ª and 22ª, which are recessed to fit over the upper tubular ends of the lamp brackets 14, and 23. The brackets 14 and 23 are provided with sliding stops, 35 and 36, which are connected by slots and set screws with the brackets, and arranged to slide into, or out of, operative engagement with slots 38 and 37, formed, respectively, on the lower edges of the bosses of the lamp holders 12 and 22. The lamp holder 12 has coiled about its lower end portion a spring 29, one end of said spring being connected with the lamp bracket 14, and the opposite end with the lamp holder. The lamp holder 22 has a spring 30 which is coiled about its lower end. One end of the spring is connected with the lamp bracket 23 and its other end is attached to the lamp holder 22. The springs 29 and 30 have a normal tendency to return the lamp holders and lamps to the positions shown in Fig. 1, with the lamps directed toward the front, and with the ends of the slots 37 and 38 bearing against the stops 36 and 35, when these stops have been slid upwardly so that they occupy operative relation to the slots. In this connection, the slot 37 for the right hand lamp is open on one side and is provided with a shoulder to coöperate with the stop 36 and prevent the lamp holder 22 from being turned toward the left, from the position shown in Fig. 1; and the slot 38, for the left hand lamp, is open on its left hand side, and is provided with a shoulder to coöperate with the stop 35, and prevent the lamp holder 12 from being turned toward the right, from the position shown in Fig. 1. This, of course, applies only when the stops 36 and 37 are moved up so as to coöperate with the slots 37 and 38.

The object of the above described mechanism is to provide means whereby, when the steering mechanism is operated to turn the front wheels of the automobile to the right, or to the left, the lamp-controlling mechanism will be operated simultaneously therewith to turn the two lamps in unison so as to project the two beams of light toward the left when the machine is turning in that direction, or toward the right when the machine is turning in the latter direction. The described devices are also capable of such adjustment that when the steering mechanism turns the vehicle wheels in either direction, one lamp only will be turned to project its beams in the direction that the machine is turning, while the other lamp will remain in fixed position, and will project its beams in a direction parallel with the frame of the machine, or in what may be considered a normal direction.

Referring to Fig. 1 of the drawings, if it is desired to have both lamps turned in the same direction that the automobile is turning, as when passing around a bend in the road to the left, or to the right, the following adjustments are made; the set screw 33 is turned up tightly so as to fasten the rod 13 to the lamp holder 12, and the block 19 is inserted in the slot 18 of rod 16, and is secured, by the set screw 20, at the outer end of the slot, and snugly against the pin 24. The stops 35 and 36 are moved downwardly, out of engagement with the slots 37 and 38 in the bosses 12$^a$ and 22$^a$. With the parts thus adjusted, when the steering shaft 2 is operated to effect, through the worm gear, arbor 28, crank 26, connecting rod 27 and steering knuckle crank arm 25, and the other connections, the simultaneous turning of the front wheels of the vehicle, the pinion 8, rack 7, rack 32, pinion 31, and connections will automatically turn the lamp holders 12 and 22, and their lamps either to the right or left, according to the direction in which the front wheels are turned. This result is secured by the described rigid connections between the two lamp holders, it being evident that the crank arm 13$^a$ will transmit its movements to the two lamp holders and cause them to turn simultaneously, in accordance with the direction of rotation of the pinion 31.

If it is desired to turn only one of the lamps in the direction that the machine is being turned, the following adjustments are made: The set screw 33 is loosened to permit the rod 13 to turn independently of the lamp holder 12, the block 19 is removed from the slot 18, and the stops 35 and 36 are slid upwardly into operative relation with the slots 38 and 37, and are secured in such position by their set screws. With these adjustments, if the steering gear is operated for causing the automobile to turn to the left, the rack 7 will be moved rearwardly, rotating pinion 31 to the left, and causing crank arm 13$^a$ to swing from left to right, and by its engagement with the right hand wall of the opening at the upper end of the lamp holder 12 swinging the lamp holder to the left so as to cast the beam of the lamp in the direction in which the machine is turning. The rod 16 will move to the right, but in the absence of the block 19, no movement will be imparted to the lamp holder 22 as the pin 24 will move idly along the slot. If the steering gear be now operated to turn the automobile to the right, a forward movement will be imparted to the rack 7, imparting rotation to pinion 31 toward the right, which will cause crank arm 13$^a$ to swing to the left and coil spring 29 will automatically return the lamp holder 12 to its position as shown in Fig. 1, where it will be arrested by the engagement of the shoulder at the end of slot 38, with the stop 35. The described movement of the crank arm will carry rod 16 to the left of the position shown in Fig. 1 until the pin 24 reaches the end of slot 18, and a further movement of the rod will turn the lamp holder 22 toward the right, thereby causing a beam from that lamp to be projected in the same direction. During this movement of the crank 13$^a$, it will not turn the left hand lamp because of the clearance afforded by the cut away portion 34, as before described. When the steering mechanism is given the requisite movement to cause the automobile to move straight ahead, the rod 16 will be returned to its position as shown in Fig. 1 and the spring 30 will automatically return the lamp holder 22 to normal position where it will be arrested by the engagement of the shoulder at the end of slot 37 with the stop 36.

The right is reserved to make such changes in the form, proportions, or relative arrangement of the several parts described herein as are contemplated by the invention, as defined in the following claims.

Having thus described my invention, what I claim as new and desire to secure by Letters Patent of the U. S. is:

1. The combination with the steering mechanism of a vehicle, of lamp supports located adjacent opposite sides of said vehicle and mounted to turn, a spindle fitting a bore within the left hand lamp support, said spindle having an angular arm passing through a slot in said support having a cut-away portion, a rod having one end pivotally connected to said arm and provided at its other end with a slot, an angular arm carried by the right hand lamp support, a pivot connecting said arm and slot, a block removably clamped within the slot and bearing against said pivot, and sliding stops arranged for movement into and out of operative relation to slots carried by said lamp supports.

2. The combination with the steering mechanism of a vehicle, of a pinion operated by said mechanism, a bar having at one end teeth engaging said pinion and at its opposite end having teeth engaging a second pinion, lamp supports located adjacent opposite sides of said vehicle and supported for axial rotation thereon, a rod fitting a bore in the left hand lamp support, said rod carrying at its lower end the last named pinion, and at its upper end provided with a crank arm, a rod pivotally connected with said arm at one end and at its other end formed with a slot, a crank arm carried by the right hand lamp support, a pivot connecting said crank arm with said slot, a block removably clamped in said slot and bearing against said pivot, and sliding stops arranged to be moved into and out of operative relation with slots formed in said lamp supports.

ERLING C. BENSON.

Witnesses:
J. W. GILTNER,
O. A. MATSON.